(12) United States Patent
Tucker

(10) Patent No.: US 6,587,103 B1
(45) Date of Patent: Jul. 1, 2003

(54) METHOD AND APPARATUS FOR DETERMINING COINCIDENT LINES

(75) Inventor: David P. Tucker, Howell, MI (US)

(73) Assignee: Autodesk, Inc., San Rafael, CA (US)

( * ) Notice: Subject to any disclaimer, the term of this patent is extended or adjusted under 35 U.S.C. 154(b) by 0 days.

(21) Appl. No.: 09/538,111

(22) Filed: Mar. 29, 2000

(51) Int. Cl.$^7$ ................................................ G06T 15/40
(52) U.S. Cl. ......................... 345/421; 345/622; 345/443
(58) Field of Search ................................ 345/421–422, 345/418–420, 585–586, 619–622, 440, 443, 427, 587, 581–583; 701/200, 208, 212; 382/173, 199, 193, 225, 226

(56) References Cited

U.S. PATENT DOCUMENTS

| | | | |
|---|---|---|---|
| 5,050,229 A | | 9/1991 | Barski et al. |
| 5,123,087 A | | 6/1992 | Newell et al. |
| 5,278,918 A | * | 1/1994 | Bernzott et al. ............ 382/173 |
| 5,325,475 A | | 6/1994 | Poggio et al. |
| 5,371,845 A | | 12/1994 | Newell et al. |
| 5,381,489 A | * | 1/1995 | Bernzott et al. ............ 382/173 |
| 5,761,328 A | * | 6/1998 | Solberg et al. ............. 382/113 |
| 5,818,460 A | | 10/1998 | Covey et al. |
| 6,038,342 A | * | 3/2000 | Bernzott et al. ............ 382/173 |
| 6,094,201 A | * | 7/2000 | Malamy et al. ............. 345/441 |
| 6,292,190 B1 | * | 9/2001 | Corn .......................... 345/427 |
| 6,323,874 B1 | * | 11/2001 | Gossett ....................... 345/619 |
| 6,446,229 B1 | * | 9/2002 | Merrick et al. ............. 714/724 |

FOREIGN PATENT DOCUMENTS

| | | | | |
|---|---|---|---|---|
| JP | 401191012 A | * | 8/1989 | ........... G01B/21/20 |
| JP | 401281571 A | * | 11/1989 | ........... G06F/15/60 |

OTHER PUBLICATIONS

S. Finch, Quadtree Constants, 7 pgs. 1999.*
Nikos Drakos, The Duality Principle, 1 pg. Feb. 5, 1996.
E.W. Weisstein and Wolfram Research, Inc., Quadtree, 1 pg. ©1996–2000.

(List continued on next page.)

Primary Examiner—Matthew C. Bella
Assistant Examiner—Wesner Sajoús
(74) Attorney, Agent, or Firm—Gates & Cooper LLP

(57) ABSTRACT

Embodiments of the invention obtain dual points by examining the intersection between each line and a perpendicular projection from the line to a point of origin. The dual points are sorted in accordance with a modified quadtree or octtree. The drawing is recursively broken up into equal subdivisions until the maximum allowed number of points for a subdivision has been reached or until the size of the subdivision is less than a tolerance value. Once the number of points in a subdivision is less than the maximum allowed number of points, the points are individually compared to each other. If the subdivision is less than a tolerance value, the subdivision is small enough such that all of the lines within the subdivision are coincident. If the number of points is greater than the maximum allowed number of points and the subdivision is larger than the tolerance, the area is recursively subdivided. If two or more dual points are in a subdivision, to determine if the lines represented are coincident, a tolerance value is compared to the distance between the two dual points. If the distance is less than (or equal to) the tolerance value, the lines are coincident. If the distance is greater than the tolerance value, the lines are not coincident. The tolerance value may be obtained by multiplying an angular tolerance by the distance from the origin to the center of the subdivision. If the lines are parallel, a parallel distance tolerance may be utilized in the comparison.

24 Claims, 8 Drawing Sheets

OTHER PUBLICATIONS

Unit 37 Images, http://geography.otago.ac.nz/Mirrors/NCGIA_GIS_CURRICULUM/notegifs/u37i.html, 3 pgs. Aug. 30. 1997.

Unit 37–Quadtree Algorithms and Spatial Indexes, 12 pgs., Aug. 30, 1997.

CS267:Notes for Lecture 26, Apr. 20, 1995, Quadtrees and Octtrees, 4 pgs., Mar. 9, 2000.

S. Finch. Quadtree Constants, 7 pgs. ©1999.

Nikos Drakos, Duality Principle, 1 pg. Feb. 5, 1996.

* cited by examiner

METHOD AND APPARATUS FOR DETERMINING COINCIDENT LINES

BACKGROUND OF THE INVENTION

1. Field of the Invention

The present invention relates generally to computer implemented graphics applications, and in particular, to a method, apparatus, and article of manufacture for sorting lines displayed in a computer graphics application.

2. Description of the Related Art

Computer-implemented graphics (CAD) systems have been widely used by designers, illustrators, drafters, and engineers for a number of years. In such graphics systems, objects such as points, lines, and shapes are displayed in a drawing. Commonly, objects may overlap or intersect with each other. When one object is placed over or on top of another object, the objects are referred to as coincident.

When objects are coincident, some CAD systems may graphically display only one object. For example, if two points are coincident, only one of the points needs to be displayed. In another example, some CAD programs automatically generate centerlines or cylindrical features for an object (e.g., for holes, circular extrusions, etc.). Such centerlines may be graphically represented by dashed lines. Further, if one centerline is coincident with another centerline (e.g., if one hole is directly in front of another), the two dashed lines may appear to merge into a single solid line.

To display coincident objects as one object (e.g., as a solid line), the CAD program must determine when objects are coincident. Sorting algorithms/techniques have been used to determine when points are adjacent or near each other. For example, a quadtree algorithm is used to rapidly sort points in two dimensions. Similarly, an octtree can be used to rapidly sort points in three dimensions.

The quadtree algorithm can begin with a square or other shape equivalent to a bounding box for the shape (a bounding box is the smallest box that can contain the two or three dimensional object) in an area or plane (referred to as the root of the quadtree). Conceptually, the large square can be broken into four smaller squares (or bounding boxes) of half the perimeter and a quarter the area each. The four smaller squares are the four children of the root. Each child can in turn be broken into four (4) subsquares to get its children and so on. Each box is represented in a tree structure as a node, with four branches from each node connecting the node to its children. The smallest boxes are represented as leaves at the bottom of the tree. Each leave of the quadtree is stored in memory. An octtree is similar, but with eight (8) children per node, corresponding to the eight (8) subcubes of a larger cube.

The quadtree and octtree are constructed to store points with the leaves of the tree containing (or having pointers to) the positions of the points (and other information) in the corresponding box. If points are not uniformly distributed on a drawing/bounding box, many of the leaves of a quadtree are empty. Accordingly, in a quadtree, instead of storing the empty leaves, the squares may be subdivided only when they contain more than one (1) point. Consequently, there may be exactly as many leaves as points (or several points on a leaf) and the children may be ordered counterclockwise starting at the lower left. FIG. 1A illustrates a drawing that has been subdivided in accordance with the adaptive quadtree algorithm. FIG. 1B illustrates an adaptive quadtree in accordance with the drawing of FIG. 1A.

Although the quadtree algorithm is utilized to sort points in two (2) dimensions, there are currently no mechanisms available to determine when two lines or objects are coincident. To make such a determination, every object/line in a drawing is compared to every other line in the drawing. Such a comparison results in operations on the order of the square of the number of lines, which can be prohibitive for a large number of lines. Thus, there is a need in the art for a fast and efficient method for sorting lines and determining when lines are coincident.

SUMMARY OF THE INVENTION

A method, system, apparatus, and article of manufacture for determining coincident lines. Graphics application programs often need to determine when two or more lines are coincident. One or more embodiments of the invention obtain dual points by examining the intersection between each line and a perpendicular projection from the line to a point of origin. An angular tolerance and a parallel distance tolerance are obtained to utilize in the determination of a tolerance value for coincident lines.

The dual points are sorted in accordance with a modified quadtree algorithm or octtree. The drawing is recursively broken up into equal subdivisions (e.g., four quadrants if two dimensional or eight if three dimensional) until the maximum allowed number of points for a subdivision has been reached or until the size of the subdivision is less than a tolerance value. Once the number of points in a subdivision is less than or equal to the maximum allowed number of points per subdivision, the points can be individually compared to each other. Further, if the subdivision is less than a tolerance value, the subdivision is small enough such that all of the lines within the subdivision are coincident. If the number of points is greater than the maximum allowed number of points and the subdivision is larger than the tolerance, the area is recursively subdivided.

If two or more dual points are in a subdivision, to determine if the lines represented are coincident, a tolerance value is compared to the distance between the two dual points. If the distance is less than (or equal to) the tolerance value, the lines are coincident. If the distance is greater than the tolerance value, the lines are not coincident. The tolerance value that is utilized in the comparison may be obtained by multiplying an angular tolerance by the distance from the point of origin to the center of the subdivision. Alternatively, if lines are parallel, a parallel distance tolerance may be utilized in the comparison.

BRIEF DESCRIPTION OF THE DRAWINGS

Referring now to the drawings in which like reference numbers represent corresponding parts throughout.

DETAILED DESCRIPTION OF THE INVENTION

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Embodiments of the invention provide a method, system, and article of manufacture for rapidly sorting a group of lines into "bins" representing groups of coincident lines. Perpendicular projections from the point of origin of a drawing to each line are evaluated to obtain the intersecting point (referred to as a dual point). After obtaining an angular tolerance and a parallel distance tolerance, the dual points are processed through a modified quadtree algorithm. Consequently, the results from the modified quadtree algorithm provide a quadtree with the sorted dual points that represent the lines. Embodiments of the invention can also be implemented in three dimensions using an octtree.

Hardware and Software Environment

Figure 1A:
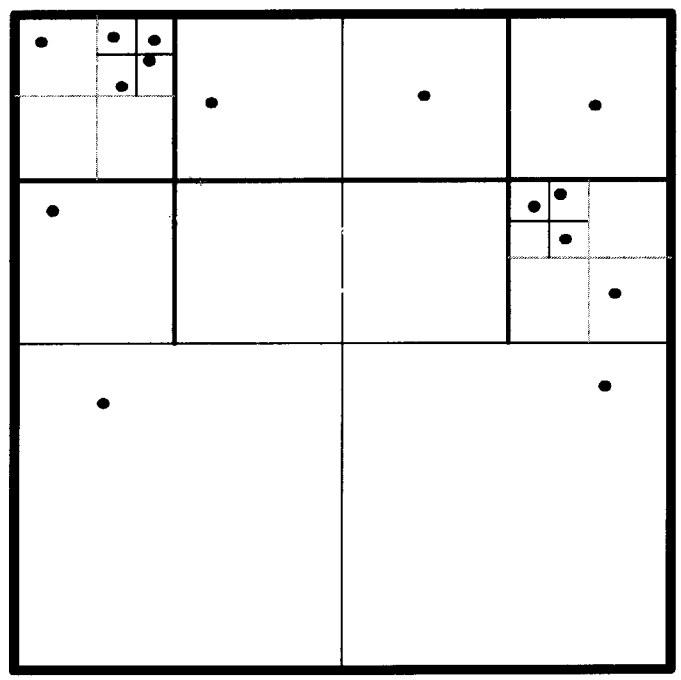
FIG. 1A illustrates a drawing that has been subdivided in accordance with an adaptive quadtree algorithm.
Figure 1B:
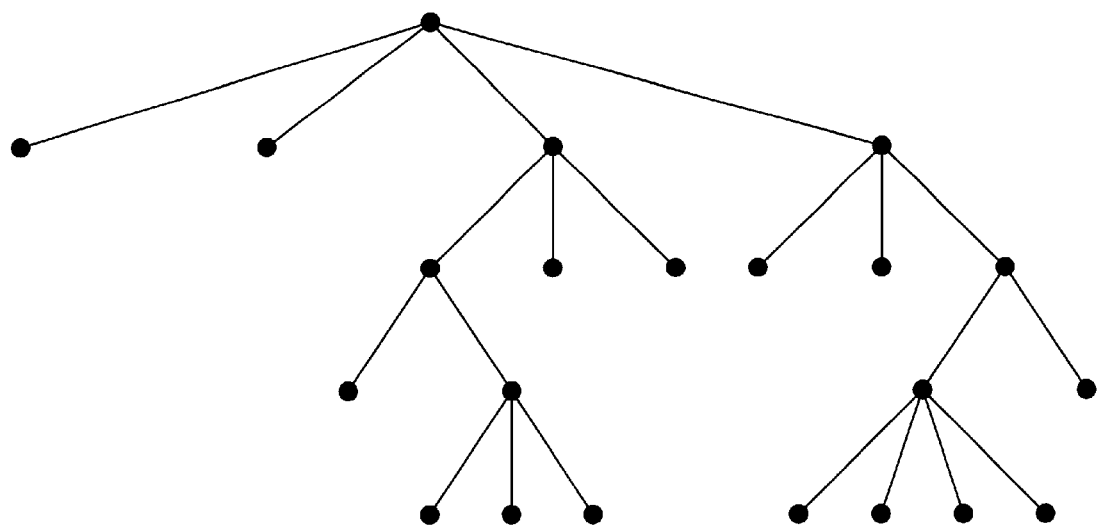
FIG. 1B illustrates an adaptive quadtree in accordance with the drawing of FIG. 1A.
Figure 2:
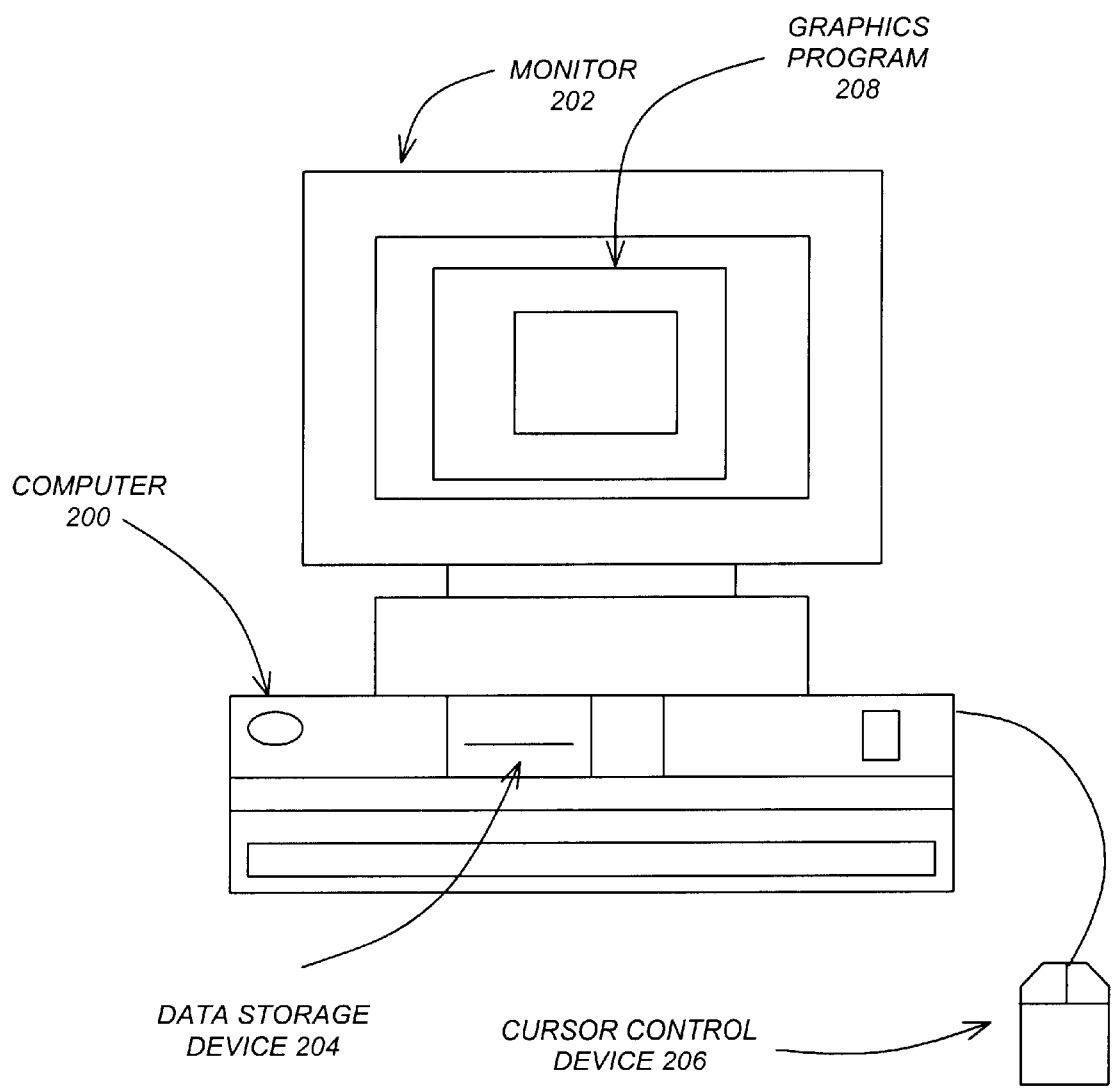
FIG. 2 is an exemplary hardware environment used in accordance with one or more embodiments of the invention.

FIG. 2 is an exemplary hardware and software environment used to implement one or more embodiments of the invention. Embodiments of the invention are typically implemented using a computer 200, which generally includes, inter alia, a monitor 202, data storage devices 204, cursor control devices 206, and other devices. Those skilled in the art will recognize that any combination of the above components, or any number of different components, peripherals, and other devices, may be used with the computer 200.

The preferred embodiment of the present invention is implemented by a computer-implemented graphics program 208, wherein the graphics program 208 is represented by a window displayed on the monitor 202. Generally, the graphics program 208 comprises logic and/or data embodied in or readable from a device, media, carrier, or signal, e.g., one or more fixed and/or removable data storage devices 204 connected directly or indirectly to the computer 200, one or more remote devices coupled to the computer 200 via a data communications device, etc.

Those skilled in the art will recognize that the exemplary environment illustrated in FIG. 2 is not intended to limit the present invention. Indeed, those skilled in the art will recognize that other alternative environments may be used without departing from the scope of the present invention.

Computer-Implemented Graphics Program

Figure 3:
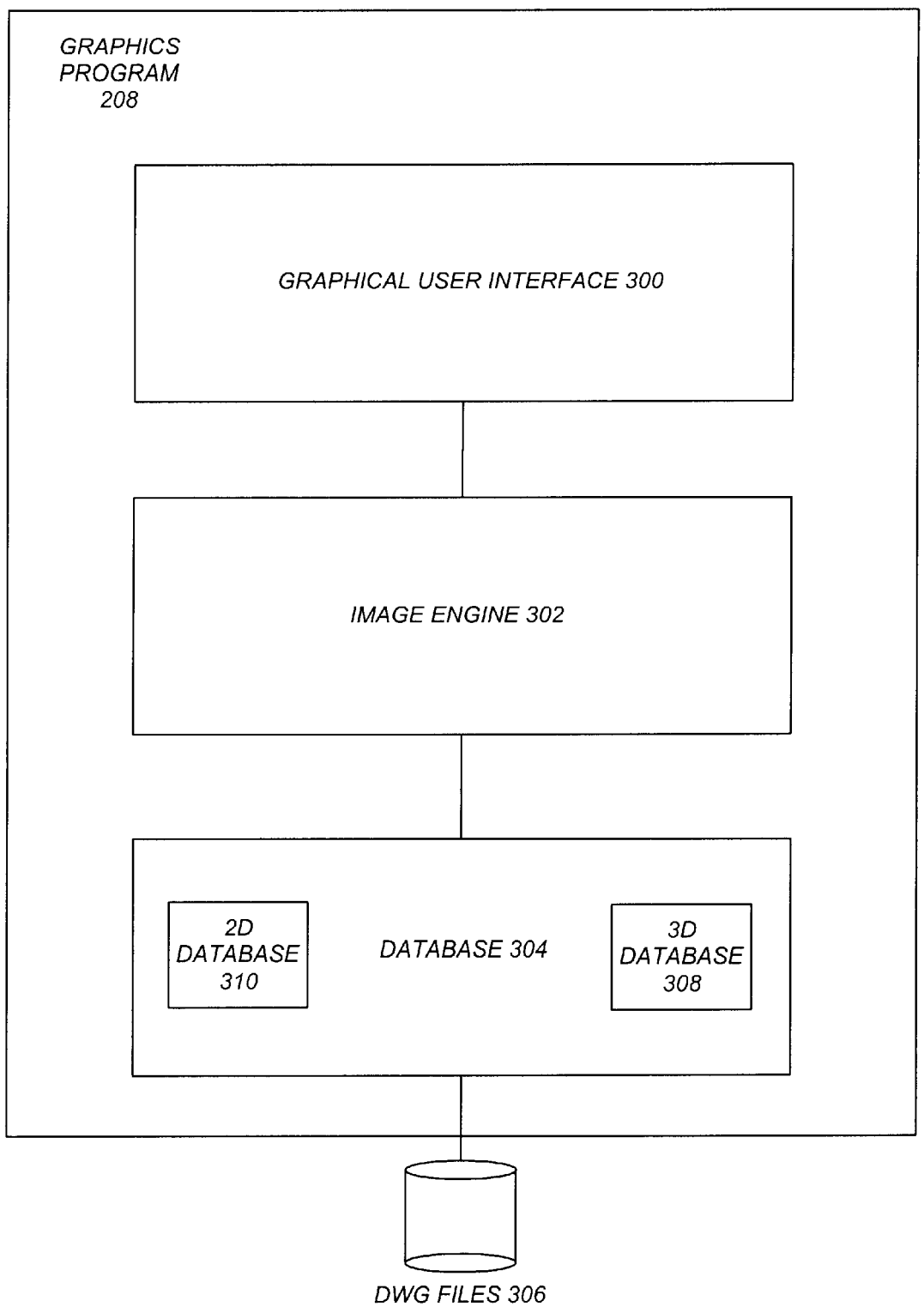
FIG. 3 is a block diagram that illustrates the components of the computer-implemented graphics program in accordance with one or more embodiments of the invention.

FIG. 3 is a block diagram that illustrates the components of the graphics program 208 according to the preferred embodiment of the present invention. There are three main components to the graphics program 208, including: a Graphical User Interface (GUI) 300, an Image Engine (IME) 302, and a DataBase (DB) 304 for storing objects in Drawing (DWG) files 306.

The Graphical User Interface 300 displays information to the operator and provides the functionality for the operator's interaction with the graphics program 208.

The Image Engine 302 processes the DWG files 306 and delivers the resulting graphics to the monitor 202 for display.

In the preferred embodiment, the Image Engine 302 provides a complete application programming interface (API) that allows other computer programs to interface to the graphics program 208 as needed.

The Database 304 is comprised of two separate types of databases: (1) a 3D database 308 known as the "3D world space" that stores 3D information; and (2) one or more 2D databases 310 known as the "2D view ports" that stores 2D information derived from the 3D information.

Object List

Figure 4:
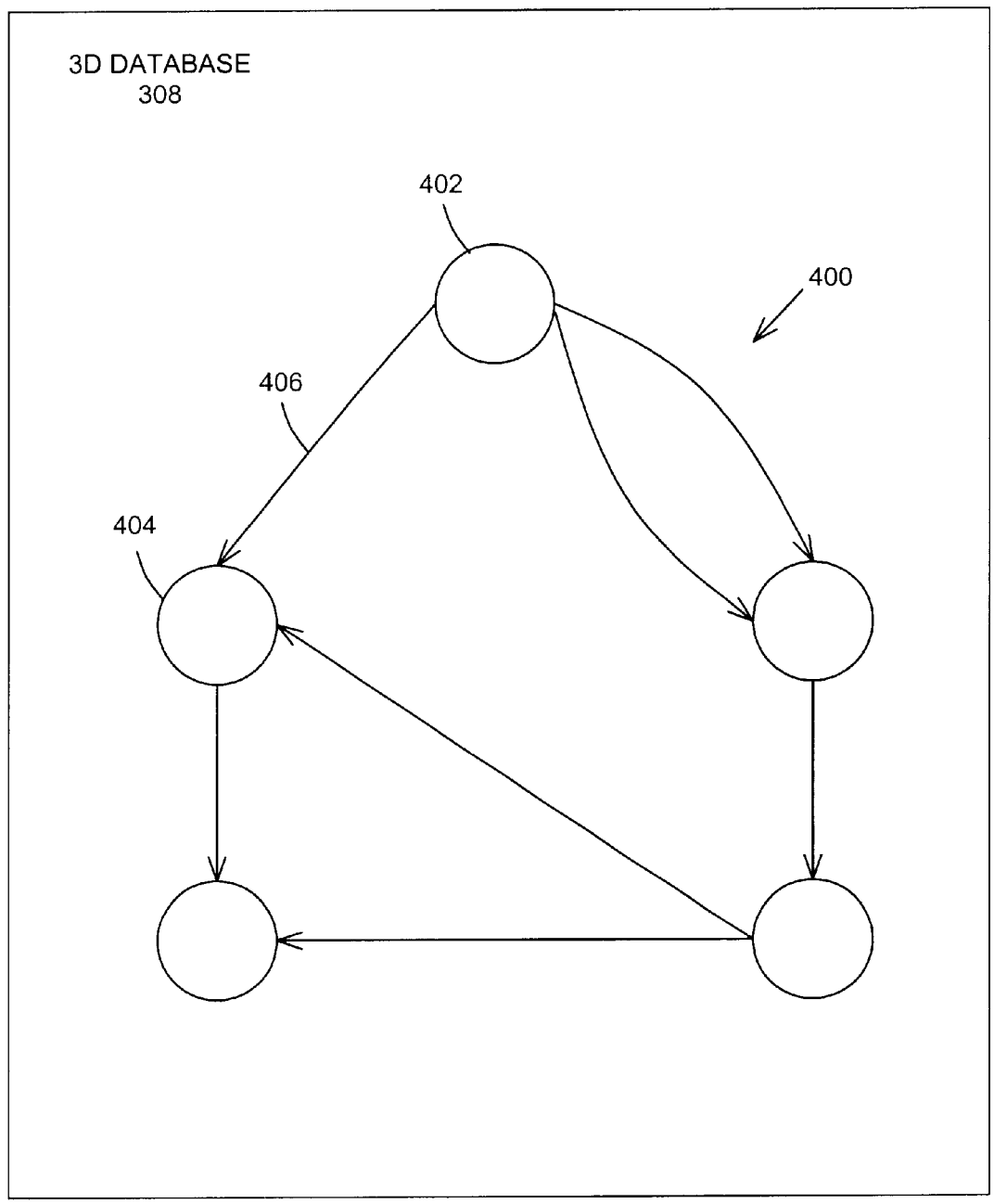
FIG. 4 is a block diagram that illustrates the structure of an object list maintained by each of the three-dimensional databases of the computer-implemented graphics program in accordance with one or more embodiments of the invention.

FIG. 4 is a block diagram that illustrates the structure of an object list 400 maintained by the 3D databases 308 in accordance with one or more embodiments of the invention. The object list 400 is usually comprised of a doubly linked list having a list head 402 and one or more objects 404 interconnected by edges 406, although other structures may be used as well. There may be any number of different object lists 400 maintained by the 3D databases 308. Moreover, an object 404 may be a member of multiple object lists 400 in the 3D databases 308.

Embodiment Details

As described above, objects 404 are utilized by the graphics program 208 to represent points, lines, shapes, etc. One or more embodiments of the invention provide a mechanism for rapidly sorting a group of lines into "bins" representing groups of coincident lines. Further, embodiments of the invention may be utilized in either two or three dimensions.

Figure 5A:
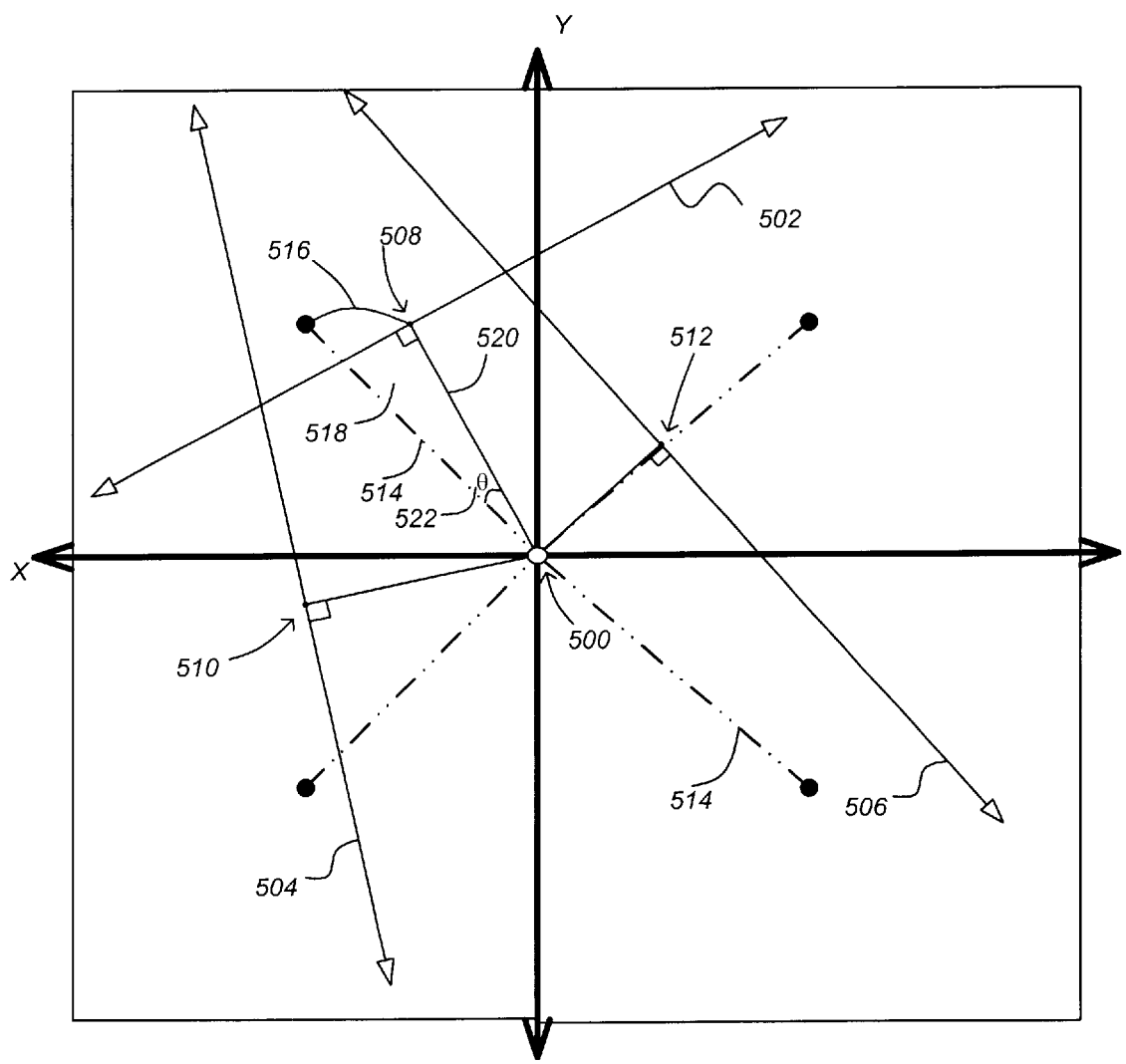
FIGS. 5A and 5B illustrate lines and their respective dual points with respect to a point of origin.
Figure 5B:
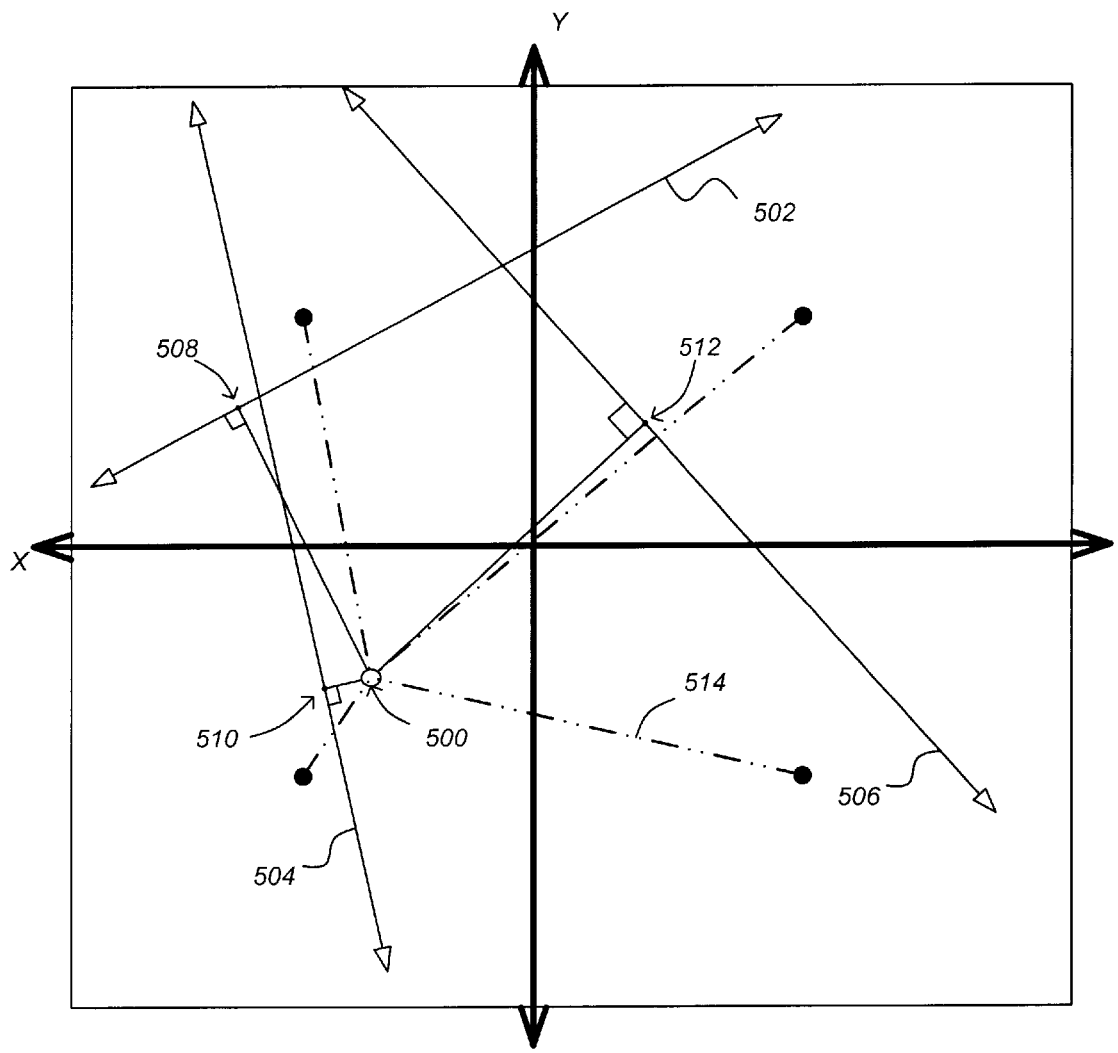

Every infinite line on a plane can be uniquely identified by a "dual point." A "dual point" is defined as the point on the line to which the origin point projects in a perpendicular direction, i.e., the closest point on the line to the origin. FIGS. 5A and 5B illustrate lines 502–506 and their respective dual points 508–512 with respect to the point of origin 500. Thus, as illustrated in FIG. 5A and FIG. 5B, a unique point may be identified on every infinite line (e.g., lines 502–506) by viewing the intersection of the line and a perpendicular projection from the point of origin 500. Such a dual point 508–512 is also the closest point on the line 502–506 to the origin 500.

Once the dual points 508–512 have been determined, the x-y coordinates of each dual point can be searched against the coordinates of the dual points of other lines. In accordance with one or more embodiments, the coordinates of the dual points are compared/sorted using a modified quadtree algorithm. However, the sorting cannot be applied to any lines that actually pass through an origin 500 located at (0,0) as in FIG. 5A (which will always have a dual of (0,0) regardless of the line's direction) because the dual points for such lines will always be the same (causing the lines to always be placed in the same quadrant). To accommodate such origin intersecting lines, embodiments of the invention may either:

(1) Compare each line on a line by line basis;

(2) Use a point of origin other than (0,0) such as ($\pi$,e), or another non-rational point as illustrated in FIG. 5B. Since it is highly unlikely that multiple non-coincident lines will pass through this point, it is less likely that every points/lines will have to be compared to each other point/line (which occurs when a line intersects with the point of origin); or (3) Perform a post-processing step to ensure that groups of coincident lines truly are coincident before returning the lines to the calling routine.

Modified Quadtree

The general principles of the quadtree algorithm described above may be utilized. However, to accommodate lines and determine whether the lines are coincident, embodiments of the invention utilize a modified quadtree algorithm. To better understand implementations of the invention, it is useful to further describe the properties and attributes of dual points and lines.

Since computer systems permit and support the use of extremely small units of measurement (e.g., a pixel), lines/objects are rarely exactly coincident. For example, two lines that are drawn at the same angle, are one pixel or millimeter apart, and are viewed at 50% of their actual size are not technically coincident. However, since such exact accuracy may not be clearly visible on a monitor 202, it is preferable to display one line or identify the lines as coincident instead of displaying (or attempting to display) two separate lines.

Each dual point 508–512 represents both the angle of the associated line, and its distance from the origin 500 (i.e. the length of the projection from the origin 500 to the line 502–506). The distance (as referred to herein) between two dual points represents a combination of the angular difference between the lines and what is termed the "parallel distance". The angular difference is the difference in the angles of the two lines. The parallel distance is the resulting distance between the lines if one line were rotated about the origin 500 until it is parallel with the other line.

A tolerance value/level defines the amount of difference between two lines/points within which the two lines/points will still be considered coincident. In other words, tolerance values are utilized to determine how similar two lines/points must be to each other in order for the two lines/points to be considered coincident. In accordance with one or more embodiments of the invention, a programmer can enter both an angular tolerance (angTol) and a parallel distance tolerance (distTol). For example, if the angular tolerance is 0° and the parallel distance tolerance is 0, the two lines must be identical in order to be coincident. If the angular tolerance is 0° and the parallel distance tolerance is 5 pixels, the two lines are considered coincident only when they are parallel (the difference between the angles of the two lines is 0) and they are within five pixels or less from each other. Additionally, any units of measurement may be utilized including pixels, millimeters, inches, etc. In one or more embodiments, the unit of measurement is proportional to the bounding box (i.e., the smallest box that can enclose the model/drawing).

By inputting an angular tolerance and a parallel distance tolerance, the maximum allowed distance (for coincident lines) between two points in any given quadtree is the lesser of either the: distTol or l*sin(angTol)

Where l is the distance from the origin 500 to the point 508–512 and distTol is the parallel distance tolerance. l is different for each point in the quadtree. If the two points are within such a maximum allowed distance, no further checks are necessary (i.e., the two points and their respective lines are coincident).

Embodiments of the invention may utilize the distance from the quadtree origin 500 to the midpoint of a quadrant (e.g., lines 514) as an approximation/estimate of the distance from the origin to the dual points within each quadrant. This distance is then used in combination with the angular tolerance to obtain a tolerance value that is used in determining coincident lines. As a result, tolerance values may be different in different quadrants of the quadtree (referred to as "dynamic tolerancing").

Further, referring to FIG. 5A, if the dual points are evaluated with respect to a circle and a wedge 518 is approximated between one of the projection lines (e.g., projection line 520) and the distance line (e.g., line 514), then the length of the arc 516 of the wedge 518 is equal to the radius (r) of the circle (e.g., distance line 514) times the angle θ 522 (between the two lines 514 and 520) in radians. By the same reasoning, if two projection lines (for two dual points) in the same quadrant are examined, the expected distance maximum (defined in terms of an arc of a circle/wedge) between the two dual points is approximately equal to the angular tolerance in radians times the distance length 514 (angular tolerance being the maximum acceptable angle between projection lines).

In view of the above, the modified quadtree provides for subdividing the drawing into quadrants until either: (a) the number of dual points in a quadrant is less than the maximum allowed number of points (e.g., eight points in a quadrant); or (b) the size of a quadrant is less than the tolerance. For example, if the maximum allowed number of points is eight (8), a drawing may continue to be subdivided until (a) there are eight dual points in a quadrant, or (b) the size of the quadrant is smaller than the tolerance for the quadrant (i.e., the quadrant is a size such that all of the points (representing lines) in the quadrant are coincident with each other). In another example, if the maximum allowed number of points is four (4), the quadrant is subdivided until (a) there are only four points in the quadrant, or (b) the size of the quadrant is smaller than the tolerance. Thus, even if there are twenty (20) points in the quadrant, if the size of the quadrant is smaller than the tolerance, all of the lines are considered coincident and no further subdivisions are necessary. If the subdividing is stopped because the maximum allowed number of points has been reached, the points remaining in the quadrant are compared to each other.

Consequently, using the modified quadtree algorithm, the lines need not be compared to each other if they are in different quadrants. Thus, fewer points are actually compared to each other to determine if lines are coincident.

The above embodiments are described in terms of two dimensions. However, embodiments of the invention may also be implemented in three dimensions. In three dimensions, the dual of a point is a plane, not a line. Hence, embodiments of the invention replace the quadtree with an octtree and identify all lines lying in a common plane as coincident. To actually match lines, an additional post-processing step may be utilized to match lines within each plane corresponding to a dual point. Such post processing may comprise applying the 2D modified quadtree algorithm within each plane, or simply sorting the lines by angle.

Logical Flow

Figure 6:
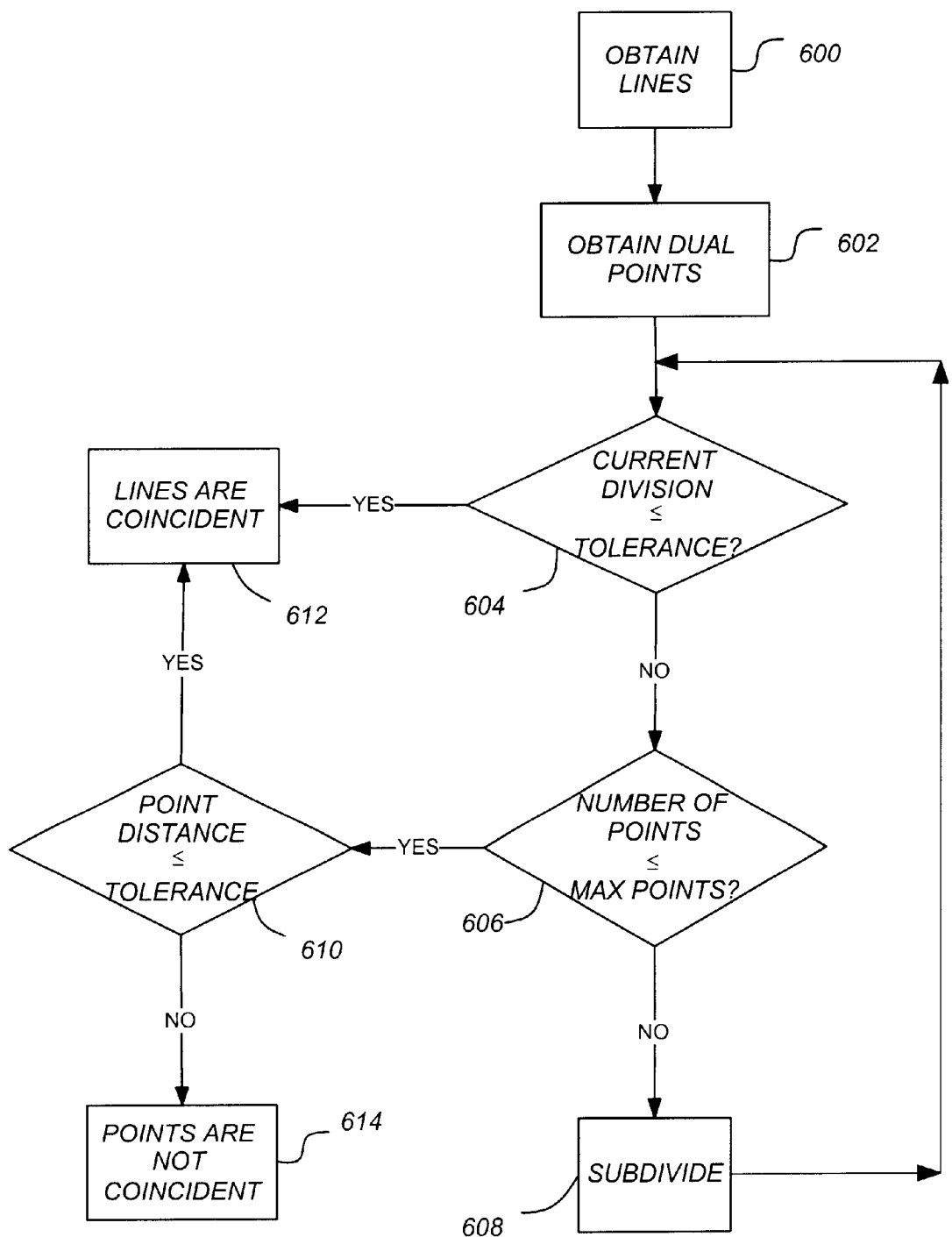
FIG. 6 is a flow chart illustrating the logical flow for determining coincident lines in accordance with one or more embodiments of the invention.

FIG. 6 is a flow chart illustrating the logical flow for determining coincident lines in accordance with one or more embodiments of the invention. At step 600, two or more lines are obtained. The lines may be passed in from a client program in the form of a point and direction for each line. The dual point for each line is obtained at step 602. As described above, the dual point is obtained by determining the intersection between the line and a perpendicular projection to the point of origin. In accordance with one or more embodiments of the invention, the lines and dual points may be placed into a linked list for easier access and manipulation.

The division/drawing containing the lines/dual points is then recursively subdivided. At step 604, a determination is made regarding whether or not the current division is less than or equal to the tolerance. If the size of the subdivision is less than or equal to the tolerance, then every point within the subdivision is coincident at step 612. However, if the size of the current division is larger than the tolerance, another determination is made as to whether the number of dual points in the current division is less than or equal to the maximum allowed number of points for a quadrant/subdivision at step 606. If the number of points is less or equal to the maximum allowed number of points, there are few enough dual points to actually compare the coordinates of each dual point independently. If the number of dual points is greater than the maximum allowed points for any given subdivision, the subdivision is subdivided into equal subdivisions at step 608 and the process continues at step 604.

For example, if a quadtree is being utilized, one of the quadrants is examined to determine if the number of points in the quadrant is less than or equal to the maximum allowed number of points at step 604. If not, the quadrant is examined to determine if the size of the quadrant is less than or equal to the tolerance at step 606. To make this determination, the distance of one side of the quadrant is compared to the tolerance. The tolerance may be equal to an angular tolerance (which may be obtained from a client program) multiplied by a relative distance from the origin point to a center point of each subdivision/quadrant (e.g., line 514). Since the distance 514 from the origin point to a center point of a subdivision/quadrant changes from quadrant to quadrant (i.e., when the origin is not (0,0)), the tolerance value changes from quadrant to quadrant (referred to as dynamic tolerancing). By utilizing dynamic tolerancing, both the angle of a line and the distance between lines are taken into account in determining when lines are coincident.

Alternatively, if two lines are parallel (i.e., the angular difference between two lines is 0°), the tolerance is equal to a parallel distance tolerance (which may also be obtained from a client program) comprised of a maximum allowed distance which two lines may be from each other in order to be considered coincident. If the size of the quadrant is larger than the tolerance value, the quadrant is subdivided into four more quadrants at step 608.

Figure 7:
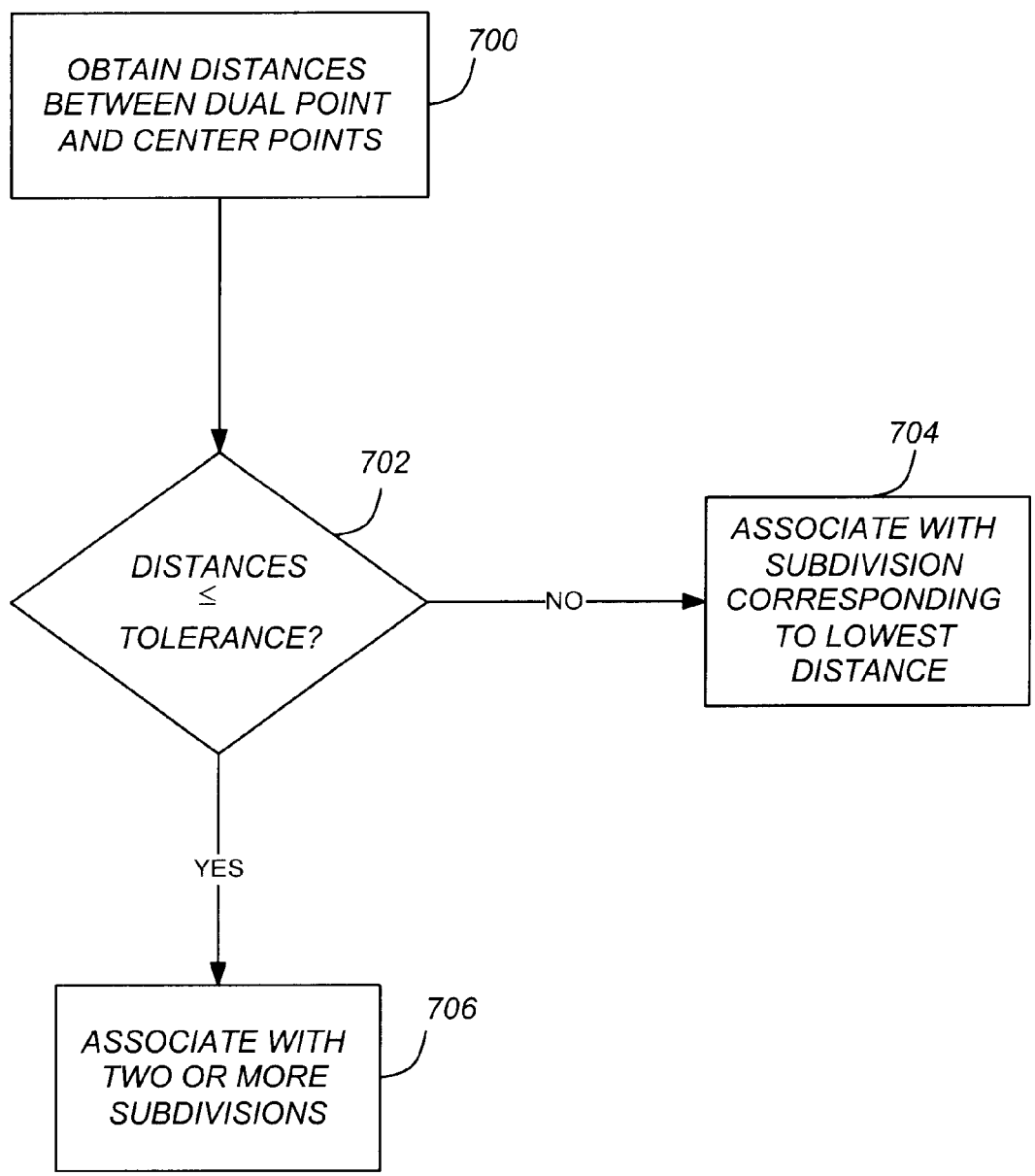
FIG. 7 is a flow chart illustrating the association of a dual point with a subdivision.

The subdivision step 608 may comprise multiple steps. For example, once a quadrant is divided into four more quadrants, the dual points must be associated with one or more of the new quadrants/subdivisions. FIG. 7 is a flow chart illustrating the association of a dual point with a subdivision. At step 700, the distances between a dual point and the center points of each quadrant are obtained. At step 702, a determination is made as to whether the difference between any two or more distances is less than or equal to the tolerance. If not, the dual point/line is associated with the subdivision corresponding to the lowest distance at step 704. If the difference between distances is less than the tolerance, the dual point is on, close to, or within the tolerance of a boundary/bounding box of two or more subdivisions. Consequently, the dual point is associated with the two or more subdivisions at step 706.

Referring back to FIG. 6, if the number of dual points in a subdivision is less than or equal to the maximum allowed number of points (at step 606), there are few enough dual points remaining in the subdivision such that they can be compared with each other. Therefore, the distances between the dual points (referred to as point distance) are obtained. The point distance may be obtained using the Pythagorean theorem such that the difference between any two points is equal to $\sqrt{(x_2-x_1)^2+(y_2-y_1)^2}$. At step 610, the point distance between every pair of points remaining in the subdivision is compared to the tolerance for that subdivision. If the point distance is greater than the tolerance, the points are not coincident at step 614. If the point distance is less than or equal to the tolerance, the lines are coincident at step 612.

By subdividing an area and associating the dual points with a subdivision as illustrated in FIGS. 6 and 7, it can be easily determined when two different points are not coincident. When two different dual points are associated with different subdivisions, they are not coincident and need not be compared. Only those points associated with the same subdivision need to be compared to determine if they are coincident. Further, points may not need to be compared when the size of the subdivision is less than the tolerance value (i.e., all of the points in the subdivision are coincident).

Thus, in accordance with one or more embodiments of the invention, an application is configured to determine when lines are coincident.

CONCLUSION

This concludes the description of one or more embodiments of the invention. The following describes some alternative embodiments for accomplishing the present invention.

For example, any type of computer, such as a mainframe, minicomputer, workstation or personal computer, could be used with the present invention. In addition, any program, function, or operating system providing graphical functions could benefit from the present invention.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for determining coincident lines on a drawing in a computer implemented graphics program comprising:
   (a) obtaining two or more lines;
   (b) obtaining dual points for the two or more lines by determining a point on each line to which an origin point projects in a perpendicular direction;
   (c) recursively dividing the drawing into equal subdivisions until either:
      (1) a number of dual points in a subdivision is less than or equal to a maximum allowed number of points for the subdivision; or
      (2) a size of the subdivision is less than or equal to a tolerance for coincident lines; and
   (d) associating one of the dual points with one or more of the subdivisions by:
      (1) obtaining distances between the dual point and center points of each subdivision;
      (2) associating the dual point with the subdivision corresponding to a lowest of the distances;
      (3) associating the dual point with two or more subdivisions when two or more of the distances are less than or equal to the tolerance;
   (e) determining if the lines are coincident based on the subdivisions, the tolerance, and a point distance between the dual points of the lines.

2. The method of claim 1 wherein the lines are determined to be coincident when the size of the subdivision is less than or equal to the tolerance.

3. The method of claim 1 wherein the tolerance comprises an angular tolerance multiplied by a relative distance from the origin point to a center point of each subdivision.

4. The method of claim 1 wherein the lines are determined to be coincident when the point distance is less than or equal to the tolerance.

5. The method of claim 1 wherein:

the lines are parallel;

the tolerance comprises a parallel distance tolerance; and the lines are coincident when the point distance is less than or equal to a parallel distance tolerance.

6. The method of claim 1 further comprising comparing each line to each other line in the subdivision to determine if the lines are coincident.

7. The method of claim 1 wherein the obtaining two or more lines comprises obtaining two or more line descriptions comprised of a point and a direction.

8. The method of claim 1 further comprising obtaining the tolerance from a client program.

9. A computer-implemented graphics system for determining coincident lines comprising:

(a) a computer having a monitor attached thereto;

(b) means, performed by said computer, for obtaining two or more lines;

(c) means, performed by said computer, for obtaining dual points for the two or more lines by determining a point on each line to which an origin point projects in a perpendicular direction;

(d) means, performed by said computer, for recursively dividing the drawing into equal subdivisions until either:

(1) a number of dual points in a subdivision is less than or equal to a maximum allowed number of points for the subdivision; or (2) a size of the subdivision is less than or equal to a tolerance for coincident lines; and (e) means, performed by said computer, for associating one of the dual points with one or more of the subdivisions by:

(1) obtaining distances between the dual point and center points of each subdivision;

(2) associating the dual point with the subdivision corresponding to a lowest of the distances;

(3) associating the dual point with two or more subdivisions when two or more of the distances are less than or equal to the tolerance;

(f) means, performed by said computer, for determining if the lines are coincident based on the subdivisions, the tolerance, and a point distance between the dual points of the lines.

10. The system of claim 9 wherein the lines are determined to be coincident when the size of the subdivision is less than or equal to the tolerance.

11. The system of claim 9 wherein the tolerance comprises an angular tolerance multiplied by a relative distance from the origin point to a center point of each subdivision.

12. The system of claim 9 wherein the lines are determined to be coincident when the point distance is less than or equal to the tolerance.

13. The system of claim 9 wherein:

the lines are parallel;

the tolerance comprises a parallel distance tolerance; and the lines are coincident when the point distance is less than or equal to a parallel distance tolerance.

14. The system of claim 9 further comprising means, performed by the computer, for comparing each line to each other line in the subdivision to determine if the lines are coincident.

15. The system of claim 9 wherein the means for obtaining two or more lines comprises means, performed by the computer, for obtaining two or more line descriptions comprised of a point and a direction.

16. The system of claim 9 further comprising means, performed by the computer for obtaining the tolerance from a client program.

17. An article of manufacture embodying logic for performing a method for determining coincident lines, the method comprising:

(a) obtaining two or more lines;

(b) obtaining dual points for the two or more lines by determining a point on each line to which an origin point projects in a perpendicular direction;

(c) recursively dividing the drawing into equal subdivisions until either:

(1) a number of dual points in a subdivision is less than or equal to a maximum allowed number of points for the subdivision; or (2) a size of the subdivision is less than or equal to a tolerance for coincident lines; and (d) associating one of the dual points with one or more of the subdivisions by:

(1) obtaining distances between the dual point and center points of each subdivision;

(2) associating the dual point with the subdivision corresponding to a lowest of the distances;

(3) associating the dual point with two or more subdivisions when two or more of the distances are less than or equal to the tolerance;

(e) determining if the lines are coincident based on the subdivisions, the tolerance, and a point distance between the dual points of the lines.

18. The article of manufacture of claim 17 wherein the lines are determined to be coincident when the size of the subdivision is less than or equal to the tolerance.

19. The article of manufacture of claim 17 wherein the tolerance comprises an angular tolerance multiplied by a relative distance from the origin point to a center point of each subdivision.

20. The article of manufacture of claim 17 wherein the lines are determined to be coincident when the point distance is less than or equal to the tolerance.

21. The article of manufacture of claim 17 wherein:

the lines are parallel;

the tolerance comprises a parallel distance tolerance; and the lines are coincident when the point distance is less than or equal to a parallel distance tolerance.

22. The article of manufacture of claim 17, the method further comprising comparing each line to each other line in the subdivision to determine if the lines are coincident.

23. The article of manufacture of claim 17 wherein the obtaining two or more lines comprises obtaining two or more line descriptions comprised of a point and a direction.

24. The article of manufacture of claim 17, the method further comprising obtaining the tolerance from a client program.

* * * * *